United States Patent
Ottesen et al.

[11] Patent Number: 5,301,080
[45] Date of Patent: Apr. 5, 1994

[54] BIAS SERVO LOOP FOR MAGNETO-RESISTIVE READ/WRITE HEAD

[75] Inventors: Hal H. Ottesen; Gordon J. Smith, both of Rochester, Minn.

[73] Assignee: International Business Machines Corporation, Armonk, N.Y.

[21] Appl. No.: 999,628

[22] Filed: Dec. 31, 1992

[51] Int. Cl.⁵ .......................... G11B 5/127; G11B 5/03
[52] U.S. Cl. ........................................ 360/113; 360/66
[58] Field of Search .................... 360/66, 113, 65, 32, 360/30, 20, 46, 67, 68

[56] References Cited

U.S. PATENT DOCUMENTS

| | | | |
|---|---|---|---|
| 3,564,160 | 2/1971 | Temes | 360/66 |
| 3,979,775 | 9/1976 | Schwarz | 360/113 |
| 4,050,086 | 9/1977 | Harr | 360/66 |
| 4,280,158 | 7/1981 | de Niet | 360/113 |
| 4,435,734 | 3/1984 | Hedberg et al. | 360/20 X |
| 4,703,378 | 10/1987 | Imakoshi et al. | 360/113 |
| 4,712,144 | 12/1987 | Klaassen | 360/67 |
| 4,796,106 | 1/1989 | Veillard | 360/30 |

Primary Examiner—John Shepperd
Assistant Examiner—Thien Le
Attorney, Agent, or Firm—Homer L. Knearl

[57] ABSTRACT

A bias current servo loop for a magneto-resistive recording head detects distortion in the read signal from the MR head, and adjusts the operating point for the head to minimize the distortion. The distortion is detected by monitoring the second harmonic of a digitized sample of the read signal. A running average of the digitized amplitude of the second harmonic is generated by a digital bandpass filter. The root mean square of the running average of the digitized amplitude of the second harmonic is estimated. The estimated RMS value is compared against a reference value indicative of minimum distortion and the difference between the estimated RMS value and the reference value is used to adjust the bias current.

20 Claims, 5 Drawing Sheets

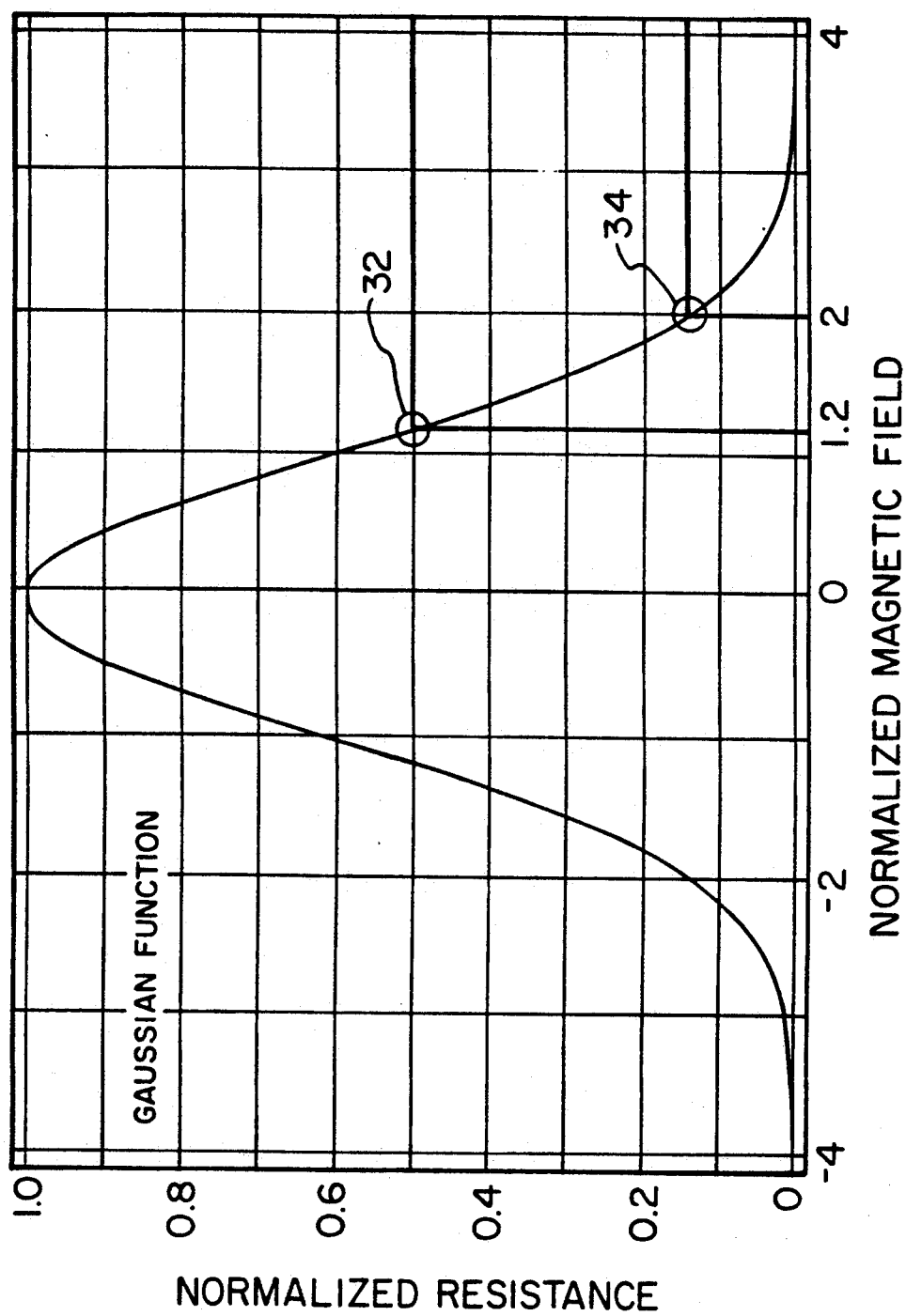

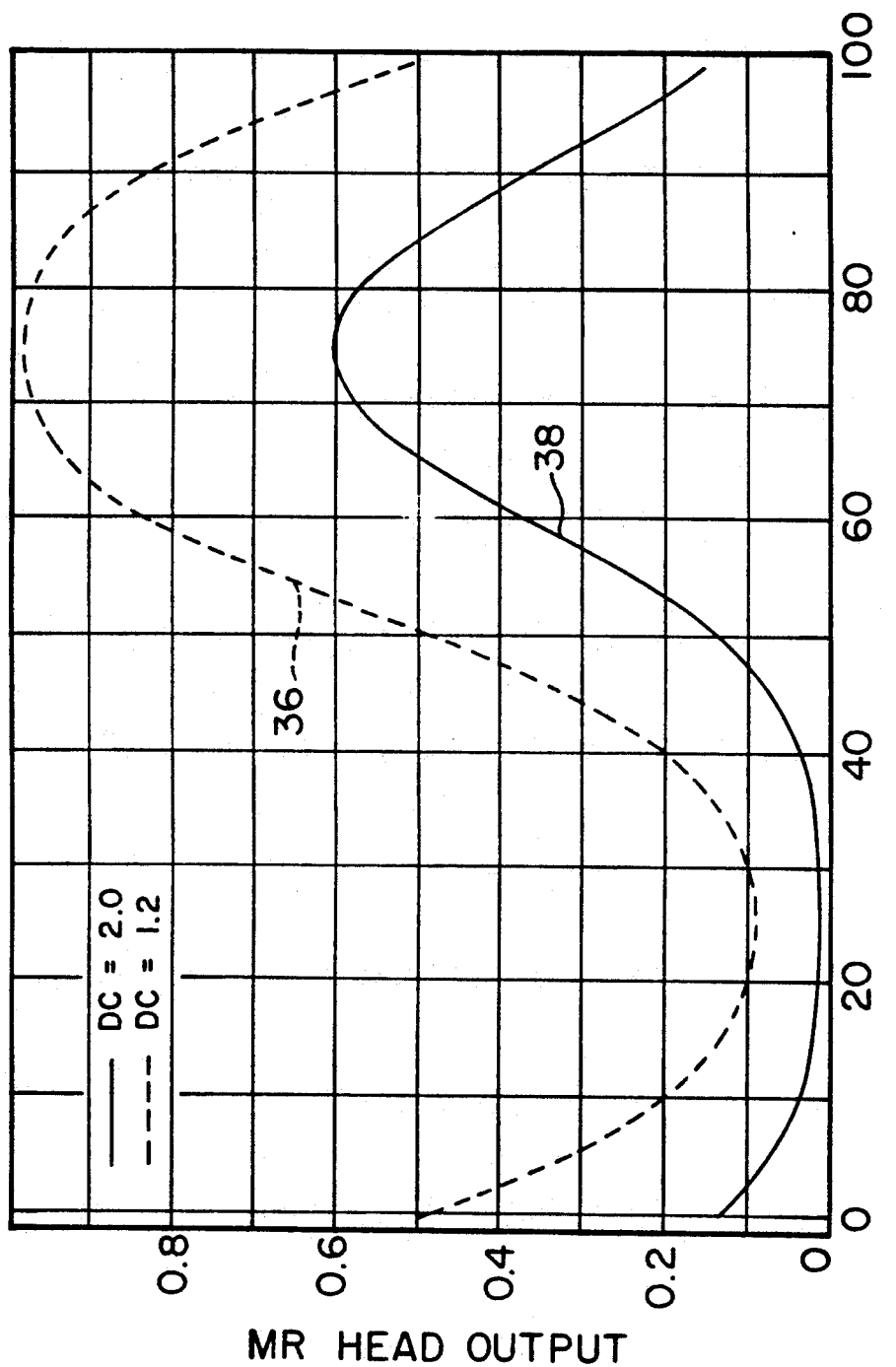

BIAS SERVO LOOP FOR MAGNETO-RESISTIVE READ/WRITE HEAD

CROSS REFERENCE TO RELATED APPLICATIONS

U.S. patent application, Ser. No. 07/1999047, filed concurrently herewith, and entitled "Digital Amplitude Estimator," invented by H. Ottesen et al, is directed to the RMS estimator used in the present invention and is incorporated herein by reference.

BACKGROUND OF THE INVENTION

1. Field of the Invention

This invention is directed to a method and apparatus for reading and writing on magnetic recording media with a magneto-resistive head. More particularly, this invention relates to linearizing the transfer characteristic of the magneto-resistive head.

2. Description of Prior Art

The transfer characteristic of Magneto-Resistive (MR) recording heads in reading or writing signals on magnetic media is very dependent on the bias current applied to the recording head. The bias current sets the operating point of the head. If the operating point is in the most linear portion of the resistance variation with magnetic field, then the transfer characteristic from sensed magnetic field to output signal from the head will be substantially linear and free of distortion.

The prior art teaches various bias circuits for MR heads that are designed to set the optimum bias current for an MR head. U.S. Pat. No. 4,050,086 by J. D. Harr, and U.S. Pat. No. 4,712,144 by K. B. Klassen are each directed to a bias circuits for MR heads. The circuits are designed to set the bias current to compensate for manufacturing variations in the resistance of the heads. U.S. Pat. No. 3,979,775 issued to T. A. Schwarz uses an additional MR element and a bias circuit to compensate the MR head and its bias current for thermal drift.

The prior art compensates for manufacturing tolerances in the heads, it compensates for slow variations in the heads such as thermal drift, but the prior art does not teach a solution to the problem of controlling the MR heads dynamically in real time to keep them operating at the correct bias current for optimum performance.

SUMMARY OF THE INVENTION

It is an object of this invention to dynamically control an MR head to maintain the head at its optimum operating point.

In accordance with this invention, the above object is accomplished by detecting distortion in the read signal from a magneto-resistive (MR) sensing element, and adjusting the bias current operating point for the MR element to minimize the distortion. The distortion is detected by monitoring the second harmonic of a digitized sample sequence of the read signal. A running average of the digitized amplitude of the second harmonic is generated by a digital bandpass filter. The root mean square of the running average of the digitized amplitude of the second harmonic is estimated. The estimated RMS value is compared against a reference value indicative of minimum distortion and the difference between the estimated RMS value and the reference value is used to adjust the bias current.

The reference value is set during a calibrate operation. The calibrate operation incrementally adjusts the bias current applied to the MR element until the estimated RMS value reaches a minimum value. When the RMS value of the second harmonic of the digitized read signal is at a minimum, the bias current is set to the optimum operation point for linear response by the MR element.

The great advantage of the bias current servo loop is that it maintains MR read/write heads in a disk drive at the optimum operating point continuously. Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 2 is a graph of the resistance characteristic of the magneto-resistive head.

FIG. 3 is a graph of the variation in MR head output resulting from a variation in magnetic field applied about two bias currents.

DESCRIPTION OF THE PREFERRED EMBODIMENTS

Figure 1:
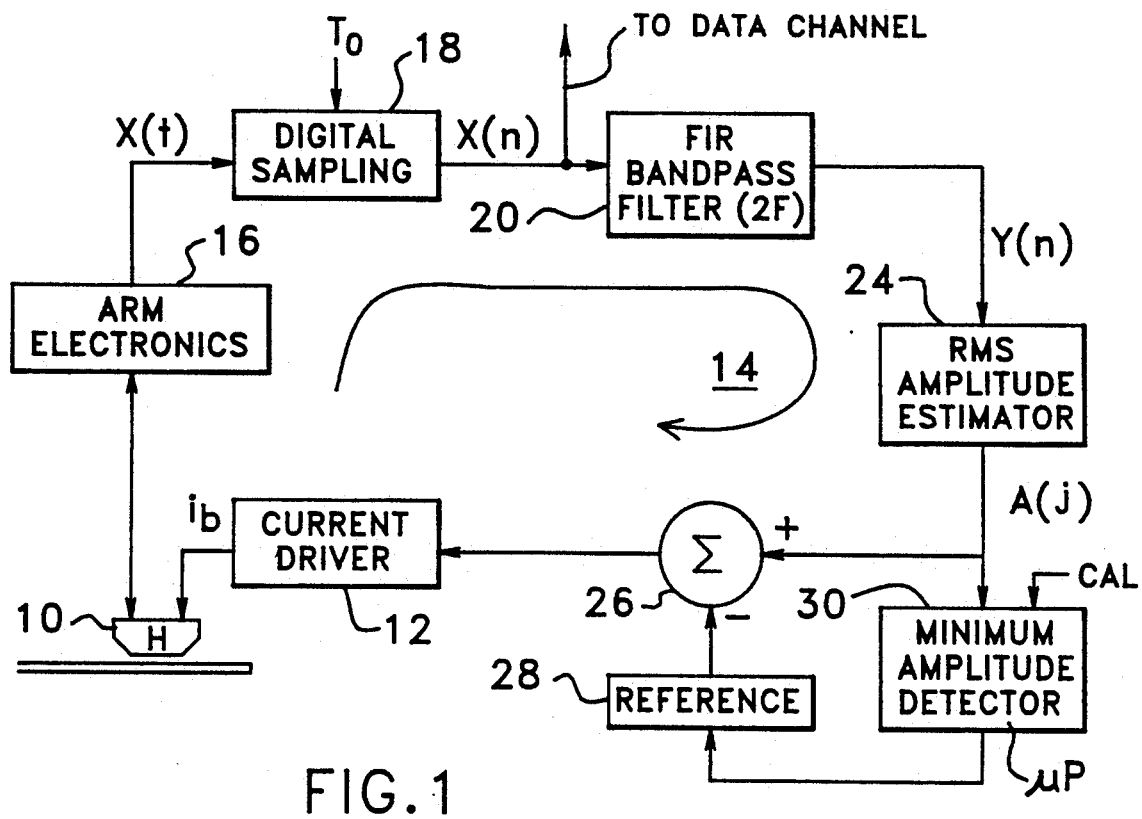
FIG. 1 shows the preferred embodiment of the bias current servo loop.

FIG. 1 shows the preferred embodiment of the invention. Magneto-resistive head 10, which is reading or writing signals on magnetic disk 11, is driven by a DC bias current $i_b$ from current driver 12. Driver 12 is controlled by feedback in servo loop 14 based on the amplitude of the second harmonic of the digitally sampled information signal from head 10.

Arm electronics 16 include an amplifier and switching logic. There are multiple read/write heads 10 connected in parallel to arm electronics 16. The arm electronics are, in turn, connected to the disk drive controller, or adapter, by a data channel. Therefore, switching logic in arm electronics 16 selects the active head for read/write operations, and connects that head to the data channel. There is only one read/write amplifier circuit in arm electronics 16, since only one head at a time is selected for connection to the data channel.

In the bias current servo loop, the read signal is picked off the data channel after the digital sampling circuit 18. Digital sampling circuit 18 samples the multiplexed analog signal X(t) at time intervals $T_0$ to digitize the read signal. In effect, the analog signal X(t) is converted to a digitized signal X(n), where n is the index number of the sample.

Figure 5:
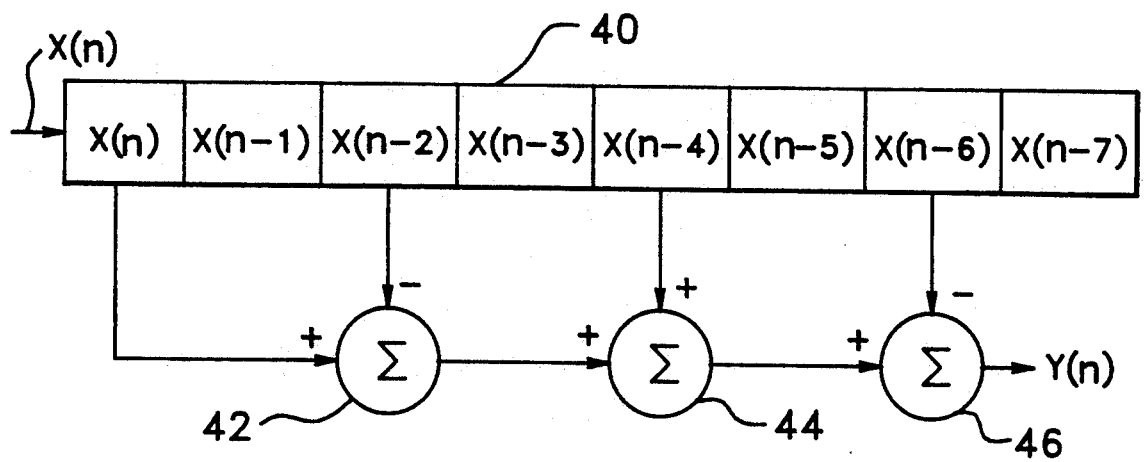
FIG. 5 shows one embodiment for the FIR bandpass filter in FIG. 1.

The digitized signal X(n) is passed through an 8-point Finite Impulse Response (FIR) bandpass filter 20 designed to indicate the amplitude Y(n) of the second harmonic component of X(n). The second harmonic is at frequency 2f, where $f = \frac{1}{8}T_0$, and $T_0$ is the time interval between samples. The digital value Y(n) for each sample n of X(n) is a measure of the amplitude of the second harmonic at that time. The FIR bandpass filter is shown in FIG. 5 and will be described subsequently.

RMS (root mean square) amplitude estimator 24 receives the amplitude value Y(n) during each sample n and, at every Kth sample, generates a digital value A(j) that is the RMS value of the amplitude Y(n) of the second harmonic over a sampling window containing multiple samples "n". In effect, the RMS value A(j) is the root mean square value of the amplitude running averages Y(n) over a sliding window viewing multiple amplitudes averages Y(n); "j" is the index of for the RMS values. The RMS estimator is described in detail in the copending commonly assigned H. H. Ottesen et al patent application referenced above.

The RMS value A(j) is applied to a difference summing circuit 26 that generates the bias current control signal for the current driver 12. The control signal is the difference between a reference value stored in register 28 and the RMS value A(j).

The reference value in register 28 may vary slowly with time depending on the changing environment of the disk drive. Accordingly, the reference value is calibrated at regular intervals. For example, the reference value might be reset each time the disk drive powers on, or each time the disk drive becomes active. The calibration is performed by minimum amplitude detector 30 when activated by the calibrate (CAL) signal. Detector 30 monitors A(j) and adjusts the reference value in register 28. When detector 30 detects that A(j) has reached a minimum value, the detector sets the reference value in register 28, and stops the calibration operation. The minimum amplitude detector is described in more detail hereinafter with reference to FIG. 7.

Figure 4:
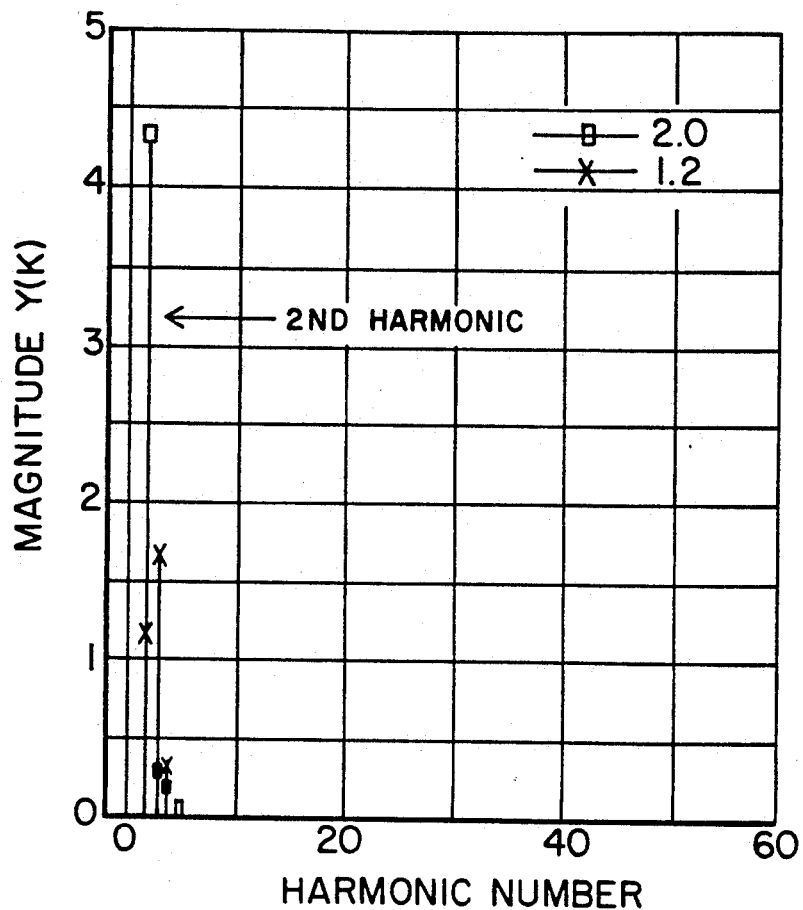
FIG. 4 is a graph of a portion of the discrete frequency spectrum of the waveforms in FIG. 3.

The theory behind the operation of servo loop 14 in FIG. 1 is illustrated in FIGS. 2-4. FIG. 2 is a graph of the resistance characteristic of a magneto-resistive head. The horizontal axis represents the strength of magnetic field sensed by the head. The vertical axis represents the value of the resistance as a result of the sensed magnetic field. The operating point on the resistance characteristic may be set with a DC bias current $i_b$ applied to the head. Two operating points are shown in FIG. 2—one is located at point 32 where $i_b$ produces a field H=1.2 units, and the other is located at point 34 where $i_b$ produces a field H=2.0 units.

It is evident that the resistance characteristic is much more linear at operating point 32 than operating point 34 in FIG. 2. A sinusoidal variation in H on unit in amplitude along the abscissa of FIG. 2 about point 32 produces a substantially sinusoidal variation in MR head output along the ordinate of FIG. 2 from the MR head that is substantially sinusoidal. However, a sinusoidal variation in H on unit in amplitude about point 34 produces a variation in resistance that is quite distorted relative to the sinusoidal input. This is due to the non-linear variation in resistance about operating point 34.

FIG. 3 illustrates the variation in MR head output produced by a sinusoidal variation in H field about operating points 32 and 34 in FIG. 2. The output signal represented in waveform 36 shows the effect on the MR head of an H field fluctuating as a sinusoid about operating point 32. The output signal in waveform 38 shows the effect on the MR head of an H field fluctuating as a sinusoid about operating point 34. Output signal 36 is distorted from a sinusoid very little, while output signal 38 is substantially distorted.

In FIG. 4, the discrete frequency spectrum magnitude for waveforms 36 and 38 in FIG. 3 are shown. The DC and first harmonic have been removed. When the frequency spectrum of waveform 36 is compared to the spectrum of waveform 38, as shown in FIG. 4, it is evident at the second harmonic that waveform 38 produces a much larger frequency spike 39 than the frequency spike 37 produced by waveform 36. Accordingly, the amplitude of the second harmonic frequency spike is directly related to the distortion of the output signal due changes in the bias current $i_b$ applied to the MR head. Accordingly, the servo loop can monitor the second harmonic of the MR head output signal and drive each head to the correct operating point by changing the bias current $i_b$ to minimize the second harmonic.

FIG. 5 shows the preferred embodiment of the 8-point Finite Impulse Response (FIR) bandpass filter 20 in FIG. 1. The output Y(n) of the filter is an instantaneous amplitude value for the second harmonic component of the digitized read signal. FIR digital filter consists simply of a shift register and three summing circuits. Shift register 40 stores the last seven samples of the digitized read signal. As each sample of the signal X(t) is taken by sampling circuit 18 (FIG. 1), the digitized sample is shifted into register 40. If the index number of the most recent sample is "10", then register 40, from left to right, stores samples X(10), X(9), X(8), X(7), X(6), X(5), X(4), X(3). Summing circuits 42, 44 and 46 are connected to sum stages X(n), X(n-2), X(n-4) and X(n-6) of shift register 40. Thus, the output Y(n) from filter 40 is X(n)-X(n-2)+X(n-4)-X(n-6). This instantaneous amplitude Y(n), produced on the occurrence of each digitized read signal sample loaded into register 40, may be viewed as samples of the second harmonic component of the digitized read signal.

In an 8-point (eight stages in register 40) FIR bandpass filter where the sampling frequency is four times the second harmonic frequency, the instantaneous amplitude Y(n) of the second harmonic is given by the expression 4Y(n)=X(n)-X(n-2)+X(n-4)-X(n-6). Except for the factor of 4 times Y(n), this expression is the result produced by the logic in FIG. 5. However, servo loop 14 makes use of changes in Y(n) rather the value of Y(n) itself, and therefore the factor of four can be ignored. The running average Y(n) is passed to the RMS amplitude estimator 24 (FIG. 1) to compute the RMS value of the amplitude of the second harmonic. As discussed above, it is the difference between the RMS value of the second harmonic compared to a reference minimum value for the second harmonic that is used to control the bias current.

Figure 6:
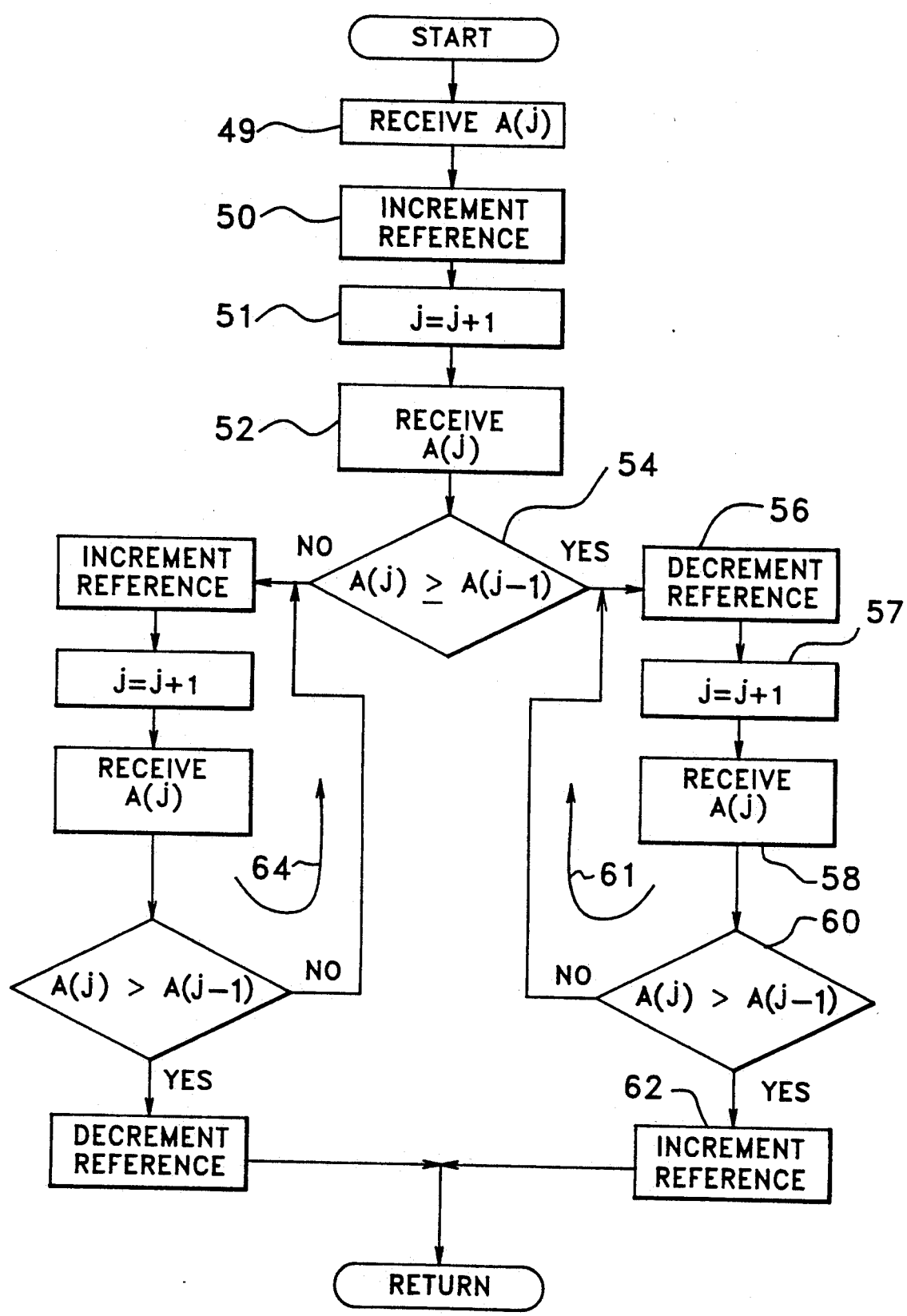
FIG. 6 shows the process flow diagram of the programmed microprocessor that performs the function of the minimum amplitude detector 30 in FIG. 1.

The reference minimum value is determined by a programmed microprocessor performing the process/logic flow in FIG. 6. In other words, the minimum amplitude detector 30 (FIG. 1) is implemented by a microprocessor chip containing some working memory in RAM, and a program in ROM to perform the process in FIG. 6. The process in FIG. 6 will be described with reference to a calibration example illustrated in the graph of RMS values in FIG. 7.

The calibration of the reference value in register 28 (FIG. 1) begins with a calibration mode command being received by the minimum amplitude detector 30 (FIG. 1). The calibration process could be performed periodically during a diagnostic or a power-on routine. The calibration mode command could be supplied by the disk drive controller or the host computer.

Figure 7:
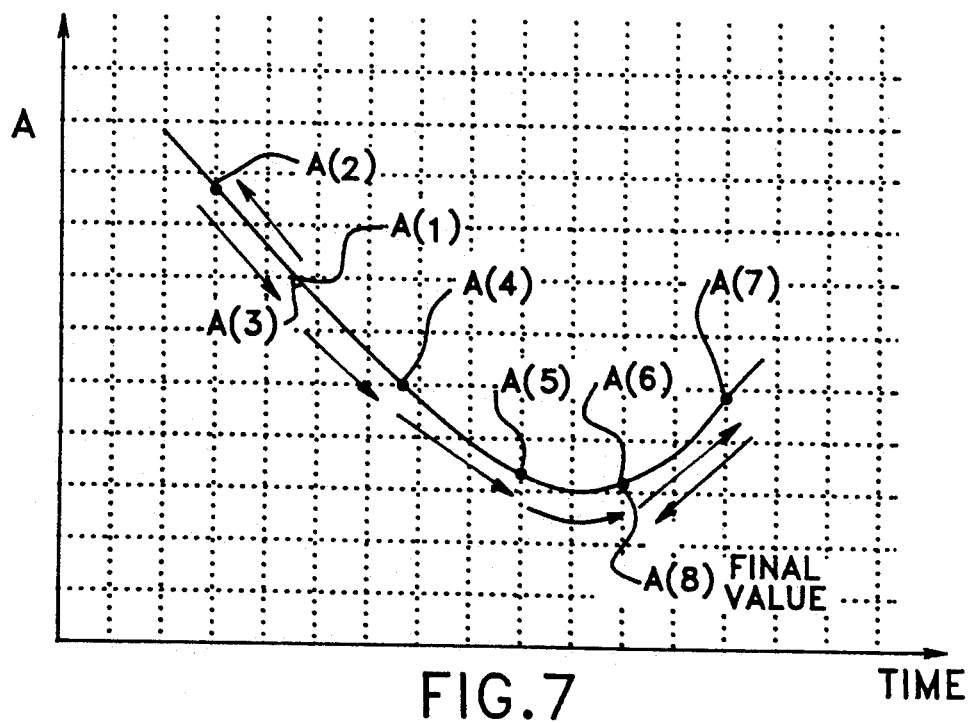
FIG. 7 is a graph of RMS values at the output of RMS amplitude estimator 24 in FIG. 1 during a calibration operation.

To begin the calibration example illustrated in FIG. 7, assume that j=1, and operation 49 in FIG. 6 receives the RMS value A(1) in FIG. 7. Operation 50 in FIG. 6 increments the reference value in register 28 (FIG. 1), and step 51 increments j by 1. Operation 52 waits and receives the next RMS value A(2) generated by RMS amplitude estimator 24 (FIG. 1). Decision 54 tests whether the RMS value of the second harmonic increased or decreased. In the example of FIG. 7, the RMS value increased so the process flow branches to operation 56.

In operation 56, the reference value in register 28 is decremented one unit. Operation 57 indexes j by one, and the process then waits to receive the next RMS value. Operation 58 receives RMS value A(3), and decision 60 tests whether the RMS value has increased or decreased. Since A(3) is less than A(2), decision 60 loops the process flow back to operation 56 where the reference value is again decremented one unit.

The loop continues through four more cycles. On the fourth cycle through the loop 61, operation 58 receives RMS value A(7). Decision 60 detects that A(7) is greater than A(6), and the process branches to operation 62. Operation 62 increments the reference one unit, and the minimum value detection process is completed. The calibration process returns program control to the routine that called the calibration process.

Process flow loop 64 in FIG. 6 operates in substantially the same manner as loop 61, except that loop 64 is entered if the initial incrementing of the reference value by operation 50 causes the RMS value to decrease rather than increase. In other words, the sequence to a minimum value using the RMS values in FIG. 7 would have been A(1) to A(4) to A(5) to A(6) to A(7) and back to A(6).

Yet another embodiment of the invention would be using more than one even harmonic. The amplitude from multiple even harmonics may be accumulated and averaged. The average even harmonic amplitude would then be applied to the RMS amplitude estimator.

While a number of preferred embodiments of the invention have been shown and described, it will be appreciated by one skilled in the art, that a number of further variations or modifications may be made without departing from the spirit and scope of our invention.

What is claimed is:

1. Apparatus for linearizing the magnetic field to output signal transfer characteristic of a magneto-resistive element comprising:
   means for biasing the element at an operating point where fluctuations in magnetic field produce a substantially linear fluctuation in resistance of the element;
   means for monitoring the amplitude of an even harmonic of the digitized signal sensed by the element; and
   means responsive to the amplitude of the even harmonic for adjusting said biasing means to move the operating point until the amplitude of the even harmonic is minimized whereby the element is biased at the optimum operating point for linearizing the transfer characteristic.

2. The apparatus of claim 1 wherein said monitoring means comprises:
   means for digitizing the signal sensed by the element; and
   means for filtering the digitized signal to produce an amplitude signal indicative of the amplitude of the second harmonic of the digitized signal.

3. The apparatus of claim 2 and in addition:
   means for determining the root mean square of the amplitude signal.

4. The apparatus of claim 3 wherein said adjusting means comprises:
   means for comparing the root mean square of the amplitude of the second harmonic to a reference value and generating a bias current error signal; and
   means responsive to the bias current error signal for driving the bias current to reduce the error signal and thereby bring the amplitude of the second harmonic equal with the reference value.

5. The apparatus of claim 4 and in addition:
   means for calibrating the reference value to produce the minimum amplitude of the second harmonic of the digitized signal.

6. The apparatus of claim 1 wherein said adjusting means comprises:
   means for comparing the amplitude of the even harmonic to a reference value and generating a bias current error signal; and
   means responsive to the bias current error signal for driving the bias current to reduce the error signal and thereby bring the amplitude of the even harmonic equal with the reference value.

7. The apparatus of claim 4 and in addition:
   means for calibrating the reference value to produce the minimum amplitude of the even harmonic of the digitized signal.

8. Bias current servo apparatus for a magneto-resistive (MR) read/write head for controlling a bias current applied to the head and thereby the operating point of the head, said apparatus comprising:
   means for driving the MR head with the bias current;
   means for digitizing the read signal from the head;
   means for detecting the amplitude of a harmonic of the digitized read signal; and
   means responsive to the harmonic amplitude for adjusting said driving means to change the bias current applied to the MR head.

9. The servo apparatus of claim 8 wherein said digitizing means comprises:
   means for periodically sampling the analog read signal to produce digital samples of the read signal.

10. The servo apparatus of claim 9 wherein said detecting means comprises:
    means for digitally filtering the digital samples to produce an amplitude value indicative of the amplitude of a harmonic of the digital samples.

11. The servo apparatus of claim 10 wherein:
    said adjusting means responsive to the harmonic amplitude value for comparing the amplitude value to a reference value indicative of the optimum operating point for the MR head and for generating a bias current error signal indicative of the difference between the amplitude value and the reference value; and
    said driving means responsive to said bias current error signal for changing the bias current applied to the MR head to reduce the bias current error signal.

12. The servo apparatus of claim 9 wherein said detecting means comprises:
    means for digitally filtering the digital samples to produce an amplitude value indicative of the amplitude of the second harmonic of the digital samples; and means for taking the root mean square (RMS) of the second harmonic amplitude value and generating an RMS value from the amplitude of the second harmonic of the digital samples.

13. The servo apparatus of claim 12 wherein: said adjusting means responsive to the RMS value for comparing the RMS value to a reference value indicative of the optimum operating point for the MR head and for generating a bias current error signal indicative of the difference between the RMS value and the reference value; and said driving means responsive to said bias current error signal for changing the bias current applied to the MR head to reduce the bias current error signal.

14. The servo apparatus of claim 13 and in addition:
means responsive to the RMS value for calibrating the reference value by incrementing and decrementing the reference value until the RMS value reaches a minimum.

15. The servo apparatus of claim 8 wherein said detecting means comprises:
means for digitally filtering the digitized signal to produce an amplitude value indicative of the amplitude of a harmonic of the digitized signal.

16. The servo apparatus of claim 15 wherein:
said adjusting means responsive to the harmonic amplitude value for comparing the amplitude value to a reference value indicative of the optimum operating point for the MR head and for generating a bias current error signal indicative of the difference between the amplitude value and the reference value; and
said driving means responsive to said bias current error signal for changing the bias current applied to the MR head to reduce the bias current error signal.

17. The servo apparatus of claim 16 and in addition:
means responsive to the harmonic amplitude value for calibrating the reference value by incrementing and decrementing the reference value until the harmonic amplitude value reaches a minimum.

18. The servo apparatus of claim 8 wherein said detecting means comprises:
means for digitally filtering the digitized signal to produce an amplitude value indicative of the amplitude of the second harmonic of the digitized signal; and
means for taking the root mean square (RMS) of the second harmonic amplitude value and generating an RMS value from the amplitude of the second harmonic of the digitized signal.

19. The servo apparatus of claim 18 wherein:
said adjusting means responsive to the RMS value for comparing the RMS value to a reference value indicative of the optimum operating point for the MR head and for generating a bias current error signal indicative of the difference between the RMS value and the reference value; and
said driving means responsive to said bias current error signal for changing the bias current applied to the MR head to reduce the bias current error signal.

20. Apparatus for linearizing the magnetic field to output signal transfer characteristic of a magneto-resistive element comprising:
means for biasing the element at an operating point where fluctuations in magnetic field produce a substantially linear fluctuation in resistance of the element;
means for monitoring the amplitude of more than one even harmonic of the digitized signal sensed by the element; and
means responsive to the amplitude of more than one even harmonic for adjusting said biasing means to move the operating point until the amplitude of the even harmonics is minimized whereby the element is biased at the optimum operating point for linearizing the transfer characteristic.

* * * * *